J. F. HAY.

PATTERN AND MEANS FOR MOLDING GARDEN AND OTHER RAKES.

No. 10,472. Reissued Apr. 29, 1884.

Witnesses.
W. R. Edelen.
Carson J. Sturgeon

Inventor
John F. Hay
Per. J. C. Sturgeon
Att'y

UNITED STATES PATENT OFFICE.

JOHN F. HAY, OF ERIE, PENNSYLVANIA.

PATTERN AND MEANS FOR MOLDING GARDEN AND OTHER RAKES.

SPECIFICATION forming part of Reissued Letters Patent No. 10,472, dated April 29, 1884.

Original No. 273,683, dated March 6, 1883. Application for reissue filed August 3, 1883.

*To all whom it may concern:*

Be it known that I, JOHN F. HAY, of Erie, in the county of Erie and State of Pennsylvania, have invented a new and Improved Pattern and Means for Molding Garden and other Rakes, of which the following is a full, clear, and exact description.

Heretofore rakes have usually been constructed with a solid shank for securing them to the handle, and secured to the handle by placing on the handle a ferrule, and afterward driving the solid shank of the rake into a hole in the end of the handle made for that purpose, the shank being either secured in place by the pressure of the wood within the ferrule or by means of a key inserted for that purpose. This method of constructing the rake is expensive; and to obviate the expense of constructing rakes in this manner various attempts have been made to cast a rake-head and ferrule in one piece, doing away with the solid shank hereinbefore referred to. Heretofore this has not been successfully accomplished, as in every case it was attempted to be done by placing the pattern in the mold in the position substantially shown in Fig. 1 of the drawings herewith—that is, by molding the rake-head and ferrule in a horizontal position, with the teeth projecting downward. In all cases this manner of molding rakes has proved a failure, as the gases generated in the mold by the hot metal in a large percentage of the rakes so cast caused air or gas bubbles in the teeth, and spoiled the rake, and it was found to be exceedingly difficult to place the core in the mold so as to make a perfect ferrule, and so large a percentage of the rakes molded in this manner prove defective that it has been found to be impracticable to mold rakes in this manner.

My invention relates to molds for garden and other rakes; and it consists in the novel construction and arrangement of parts, as will be hereinafter more specifically described, and pointed out in the claims.

Reference is made to the accompanying drawings, forming part of this specification, which illustrate my means and method of molding rakes.

Figure 1:
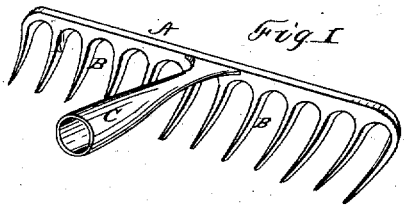
Figure 2:
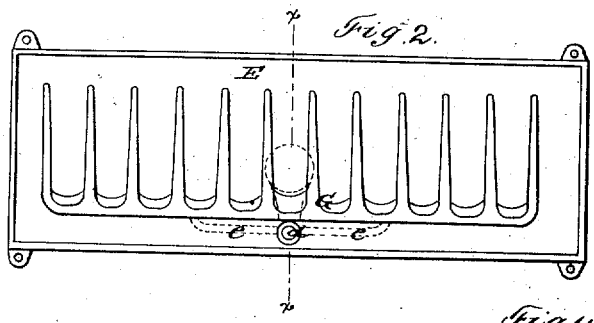
Figure 3:
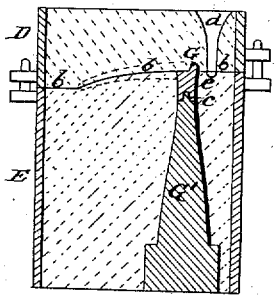
Figure 5:
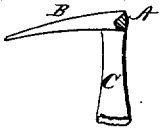
Figure 4:
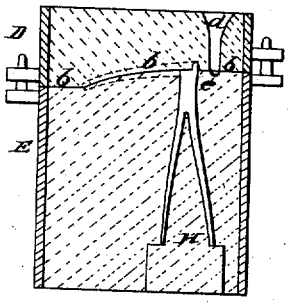
Figure 6:
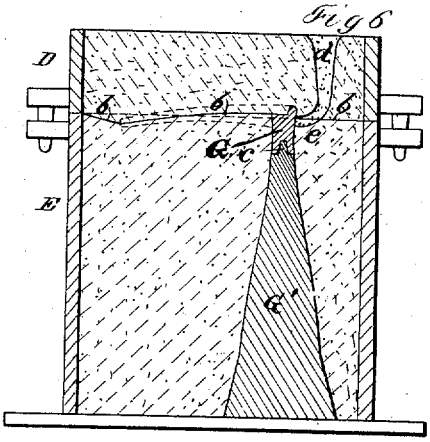
Figure 7:
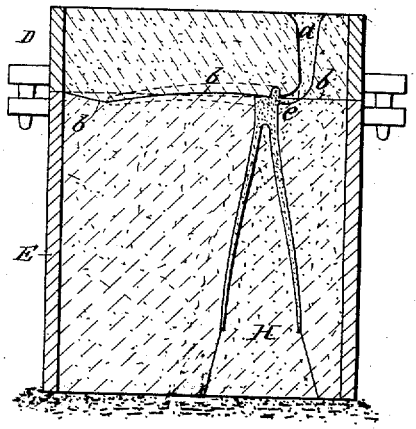

Figure 1 is a view, in perspective, of a rake-head and ferrule cast in one piece. Fig. 2 is a top view of the lower portion of the mold, the cope being removed. Fig. 3 is a vertical transverse section, on the line *x x* in Fig. 2, of a mold with the pattern therein. Fig. 4 is a like vertical section showing a mold completed, the pattern removed, and core inserted in place ready for pouring. Fig. 5 is a section of a rake-head, taken in the direction of the length of the teeth, with the lower end of the socket broken away. Fig. 6 is a vertical transverse section, on the line *x x* in Fig. 2, of an ordinary two-part flask and mold with the rake-pattern in place. Fig. 7 is a like vertical section, on the line *x x* in Fig. 2, of an ordinary two-part flask and mold therein, with the ferrule-core inserted ready for filling with molten metal.

In Figs. 1 and 5 of the drawings, A is the web or back of the rake-head, and B the teeth projecting therefrom. C is the socket or ferrule, C, A, and B being cast in a single piece, to form the completed rake.

In constructing a pattern for molding this form of rake I make it in two parts or pieces, G and G′, and connect the parts G and G′ by a suitable joint, *c*, so that when placed together they will retain their relative position to each other, as shown by the section shown in Fig. 3. To mold said rake-head and socket I construct an ordinary two-part flask consisting of a nowel, E, and cope D. I also use an ordinary cope-match. (Not shown.) I can, however, mold the rake without using a cope-match, but with less speed than by the use of it. I insert the upper portion of the pattern G into the cope-match, which covers about one-half of the width of the teeth and web A—say about one-half of their thickness. This match, with the pattern, so placed, and the part G′ of the pattern in position, is placed with the nowel E about it. The nowel E is then filled and packed with sand, after which the socket portion G′ of the pattern is withdrawn and the core H inserted in place. The nowel E is then inverted and placed upon its support. I then remove the match and place the cope D in place over the nowel E, and fill it with sand and pack it, providing an opening, *d*, for filling the mold with metal. The cope D is then lifted off, and the upper portion, G, of the pattern is withdrawn, after which the cope is replaced, the mold being completed and ready to be filled with molten metal. If desired, after the nowel E is filled and packed, it may be turned over and the cope D filled and packed before any portion of the pattern G G′ is withdrawn, after which the mold can be reversed, and the ferrule portion G′ of the pattern withdrawn, and the core H inserted in place, after which the mold can be turned back upon its bottom, the cope D removed, and the upper portion, G, of the pattern withdrawn, and the cope D upturned, thereby completing the mold; but I prefer the method first described. If desired, I can reverse the pattern and cast the socket portion of the rake in the cope of the mold instead of the nowel; but I prefer the arrangement shown.

In the drawings I have shown two forms of flask, differing in the way or line upon which they divide. I can use either form of flask I desire; but I ordinarily use the form of flask shown in Figs. 6 and 7, and consider it preferable to that shown in Figs. 3 and 4, as the flask, Figs. 6 and 7, can be used to better advantage in molding rakes. I do not, however, limit myself to the particular forms of flask shown, as I can use any ordinary two-part flask in operating my invention.

Having thus fully described my invention, what I claim, and desire to secure by Letters Patent, is—

1. A rake-molding pattern consisting of two parts—one for forming the mold for the rake portion, and the other for forming the external mold for the socket portion—the line of division between said parts being the neck of the socket-pattern, whereby the rake-mold may be divided horizontally, the mold for the rake portion may be formed horizontally, and the exterior mold for the socket portion may be formed vertically, substantially as set forth.

2. The herein-described rake-molding device, consisting of a two-part flask divided horizontally, and a two-part pattern, the latter being divided between the rake-head portion and the socket portion at the point of least diameter, whereby the mold may be divided horizontally, the exterior mold for the socket may be formed in an upright position, and the mold for the rake-teeth may be formed in a substantially horizontal position, substantially as set forth.

3. The rake-molding device consisting of two sand-box sections, D E, placed one above the other, and divided by the joint *b*, and a pattern consisting of the two pieces G G′, jointed at *c*, whereby the two-part flask may be divided horizontally, the exterior mold for the socket may be formed in an upright position, and the mold for the rake-teeth may be formed in a substantially horizontal position, as set forth.

4. The herein-described two-part rake-mold, divided substantially horizontally upon the line of the rake-teeth, the mold for the rake-head portion being formed between said parts, and the external mold for the socket portion being formed in an upright position in one of said parts, in combination with a vertically-situated core for the socket portion, substantially as set forth.

5. The herein-described two-part rake-mold, divided substantially horizontally upon the line of the rake-teeth, the mold for said teeth being formed between said parts in a position slightly inclined, the points of said teeth being lowest, and the external mold for the socket portion being formed in an upright position in the lower of said parts, in combination with a vertically-situated core for the socket portion, substantially as set forth.

Witness my hand at Erie, Pennsylvania, in presence of two witnesses.

JOHN F. HAY.

Witnesses:
HERMAN F. GIELE,
RODOLPH GARDINER.